(12) United States Patent
Yu et al.

(10) Patent No.: US 10,296,628 B2
(45) Date of Patent: May 21, 2019

(54) SAMPLE SIZE ESTIMATOR

(71) Applicant: Futurewei Technologies, Inc., Plano, TX (US)

(72) Inventors: Jiangsheng Yu, San Jose, CA (US); Hui Zang, Cupertino, CA (US)

(73) Assignee: Futurewei Technologies, Inc, Plano, TX (US)

(*) Notice: Subject to any disclaimer, the term of this patent is extended or adjusted under 35 U.S.C. 154(b) by 381 days.

(21) Appl. No.: 15/193,527

(22) Filed: Jun. 27, 2016

(65) Prior Publication Data
US 2017/0371936 A1 Dec. 28, 2017

(51) Int. Cl.
*G06F 17/30* (2006.01)
*G06F 17/18* (2006.01)

(52) U.S. Cl.
CPC ........ *G06F 17/30554* (2013.01); *G06F 17/18* (2013.01)

(58) Field of Classification Search
CPC .... G06F 17/30554; G06F 17/00; G06F 17/30; G06F 17/18
USPC ................................................. 707/600–899
See application file for complete search history.

(56) References Cited

U.S. PATENT DOCUMENTS

| | | |
|---|---|---|
| 6,636,818 B1 | 10/2003 | Lawrence |
| 2006/0050946 A1 | 3/2006 | Mitchison et al. |
| 2008/0208536 A1 | 8/2008 | Bondi |
| 2010/0128046 A1* | 5/2010 | Wei .................. G06F 17/18 345/581 |

FOREIGN PATENT DOCUMENTS

| | | |
|---|---|---|
| CN | 102518206 | 6/2012 |
| CN | 104717054 | 6/2015 |

OTHER PUBLICATIONS

"International Application No. PCT/CN2017/088603, International Search Report and Written Opinion dated Aug. 31, 2017", (dated Aug. 31, 2017), 11 pgs.

* cited by examiner

*Primary Examiner* — Isaac M Woo
(74) *Attorney, Agent, or Firm* — Schwegman Lundberg & Woessner, P.A.

(57) ABSTRACT

A method includes obtaining via a programmed computer, a first set of n random samples and a second set of n+k random samples from a base set of samples where k is a lag, iteratively adding more random samples to the first and second sets from the base set via the programmed computer, obtaining a distance between the first and second sets of random samples by calculating via the programmed computer, an empirical cumulative distribution function (ECDF) for the first and second sets in each iteration until the distance between the ECDFs is below a threshold, and constructing a stable empirical distribution representation via the programmed computer using a number of samples that is a function of the first and second sets whose distance is below the threshold.

20 Claims, 15 Drawing Sheets

SAMPLE SIZE ESTIMATOR

FIELD OF THE INVENTION

The present disclosure is related to sample size, and in particular to estimating a sample size online for constructing a stable empirical distribution.

BACKGROUND

A histogram (or empirical cumulative distribution) is a graphical way of representing a distribution of data samples. In histograms, the frequency may be a percentage of the total number of samples such that the total area of the rectangles is normalized to 1.

Some sets of data samples may be very large, and may even be continuously collected, such as data samples being generated by an online survey that is on-going. The number of samples may not be known, making it difficult or resource consuming to construct a histogram using all the samples.

SUMMARY

A method includes obtaining via a programmed computer, a first set of n random samples and a second set of n+k random samples from a base set of samples where k is a lag, iteratively adding more random samples to the first and second sets from the base set via the programmed computer, obtaining a distance between the first and second sets of random samples by calculating via the programmed computer, an empirical cumulative distribution function (ECDF) for the first and second sets, respectively, and a distance between the two ECDFS, in each iteration until the distance between the ECDFs is below a threshold, and constructing a stable empirical distribution representation via the programmed computer using a number of samples that is a function of the first and second sets whose distance is below the threshold.

A computer implemented system includes processing circuitry, a storage device coupled to the processing circuitry, and code stored on the storage device for execution by the processing circuitry to perform operations. The operations include obtaining via a programmed computer, a first set of n random samples and a second set of n+k random samples from a base set of samples where k is a lag, iteratively adding more random samples to the first and second sets from the base set via the programmed computer, obtaining a distance between the first and second sets of random samples by calculating via the programmed computer, an empirical cumulative distribution function (ECDF) for the first and second sets, respectively, and a distance between the two ECDFs, for each iteration until the distance between the ECDFs is below a threshold, and constructing a stable empirical distribution representation via the programmed computer using a number of samples that is a function of the first and second sets whose distance is below the threshold.

A non-transitory computer readable storage device has instructions for execution by a processor to perform operations. The operations include obtaining via a programmed computer, a first set of n random samples and a second set of n+k random samples from a base set of samples where k is a lag, iteratively adding more random samples to the first and second sets from the base set to create successive sets of random samples via the programmed computer, obtaining a distance between the first and second sets of random samples by calculating via the programmed computer, an empirical cumulative distribution function (ECDF) for the first and second sets, respectively, and a distance between the two ECDFs, for each iteration until the distance between the ECDFs is below a threshold, and constructing a stable empirical distribution representation via the programmed computer using a number of samples that is a function of the first and second sets whose distance is below the threshold.

DETAILED DESCRIPTION

Figure 1:
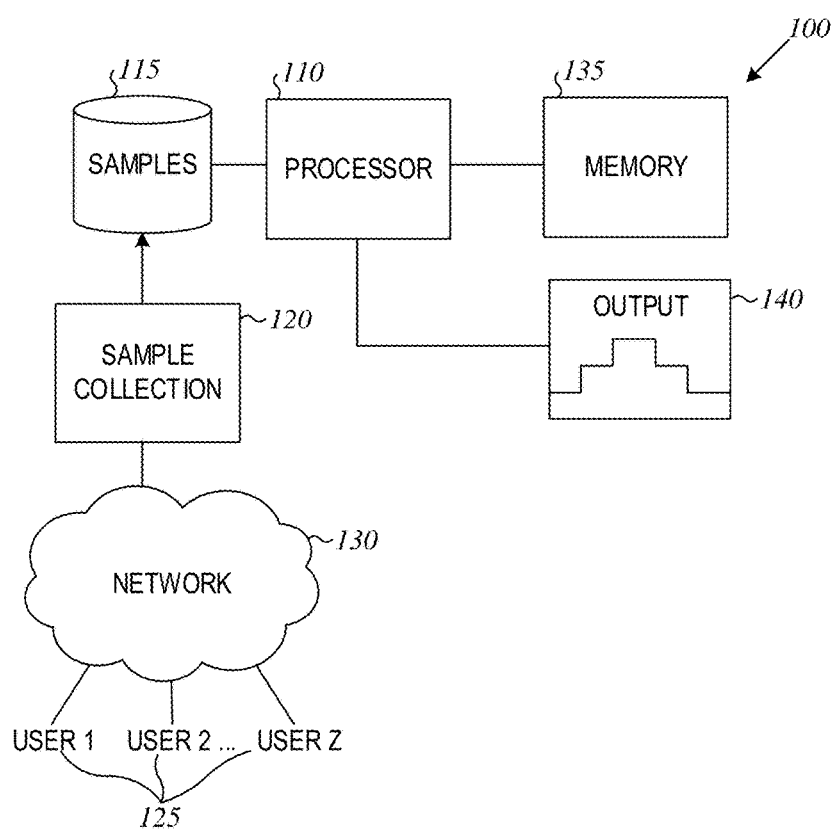
FIG. 1 is a block diagram of a system for estimating a number of samples from an original set of samples that is sufficient for constructing a stable histogram according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Some set of data samples may be very large, and may even be continuously collected, such as data samples being generated by an online survey that is on-going. The number of samples may not be known, making it difficult or resource consuming to construct a histogram using all the samples. The present inventive subject matter facilitates the calculation of a number of samples from a set of samples that may be used to generate a stable empirical distribution and hence a stable representation of the stable empirical distribution, such as a histogram. A stable histogram is one type of representation of the stable empirical distribution with a sufficient number of samples such that the contribution of additional samples may be ignored without significantly changing the information conveyed by the histogram. By estimating the number of such samples that may be used to generate a stable empirical distribution representation, valuable processing resources may be saved by greatly reducing the number of samples from the original set that need to be processed. Since the original set may contain thousands to millions or more samples, such as reduction can result in significant savings. Still further, the estimation may be made without knowledge of the number of samples in the original set. This can be quite useful where samples are still being collected, and the number is not known.

A method of determining the sample size for an efficient construction of a representation of a stable empirical distribution is based on a distance between distribution functions on successively larger consecutive sample sizes. When the distance is below a threshold, the sample size is selected based on the sample sizes of the two consecutive sample sizes that resulted in the distance being below the threshold. In various embodiments, the distance is a Kolmogorov distance, and the distribution function is an empirical cumulative distribution function. The method is applicable to very large data sets and in particular to online sampling, in which the population size is usually unknown.

FIG. 1 is a block diagram of a system 100 for estimating a number of samples from an original set of samples that is sufficient for constructing a representation of a stable empirical distribution, referred to by example as a stable histogram. A processor 110 obtains random samples from a set of samples 115, which may be a database or simply a file containing samples. The samples may be collected in various ways as indicated at 120, such as from multiple users 125 coupled via a network 130.

Samples collected via the network 130 may be termed online sampling, as the users are providing information in response to a survey or other instrument used to collect data. Online sampling may also include obtaining data from sensors, which are also represented as users in FIG. 1. In either event, online sampling provides an ever increasing number of samples as long as the sampling continues. The number of samples is thus a moving target and further, can be very large, exceeding thousands or even millions of samples.

A memory device 135 may contain programming to execute on the processor 110 to cause the processor to estimate the number of samples suitable for constructing the stable histogram 140, also referred to as an output. The output 140 may also simply be a number of samples to use to construct a histogram. In one embodiment, a range of samples may be provided, with a lower end of the range being termed a risky sample size, and the higher end of the range being termed a safe sample size. The actual construction of the histogram may use the same samples, or different randomly selected samples, such as any number of samples within the range, or on either side of the range if a riskier or even safer sample size is desired. The selection of the number of samples may also be a function of the amount of processing resources a user desires to spend on construction of a histogram. In further embodiments, a threshold may be changed to either increase or decrease a desired stability of the resulting histogram.

Further details regarding the method of estimating a suitable sample size is now provided. Given a sequence of samples $X_1, \ldots, X_n, \ldots$, the method determines how many samples are enough to construct a stable histogram. A stable histogram means that the contribution of more samples may be ignored without significant loss in the histogram or the empirical distribution construction.

In one embodiment, an empirical cumulative distribution function (ECDF) of consecutively increasing sets of random samples is calculated until the functions converge. An ECDF is an increasing step function that varies between 0 and +1. Convergence of the functions is determined by measuring the distance between ECDFs. Before arriving at the new method, some basic definitions are introduced as follows.

Definition 1.1.

The Kolmogorov distance between two distribution functions $F(x)$; $G(x)$ is the maximum difference between them. That is, $$\sup_x |F(x) - G(x)|$$

Definition 1.2.

Given the simple random samples $X_1, \ldots, X_n$, the empirical cumulative distribution function (ECDF) is defined by the following step function.

$$F^*(x) = \frac{1}{n} \#\{X_i \leq x : i = 1, 2, \ldots, n\}$$

where $\#\{X_i \leq x : i=1, 2, \ldots, n\}$ denotes the number of $X_i$'s that are no bigger than x. $X_1, \ldots, X_n$ thus define the jumping points of the function. The simple random samples are assumed to be independently and identically distributed as the population.

Let the simple random samples $X_1, \ldots, X_n, \ldots, X_{n+k}, \ldots$ be from the same population, where a lag, k, is any natural number, and $F_n^*(x)$ be the ECDF of $X_1, \ldots, X_n$. The Kolmogorov distance, $D_{n,n+k}$, is:

$$D_{n,n+k} = \sup\{|F_n^*(x) - F_{n+k}^*(x)|\} \quad \text{Eq. (1)}$$

Since ECDFs are step functions, their maximum difference could be found just by studying the values at all the jumping points.

Figure 2:
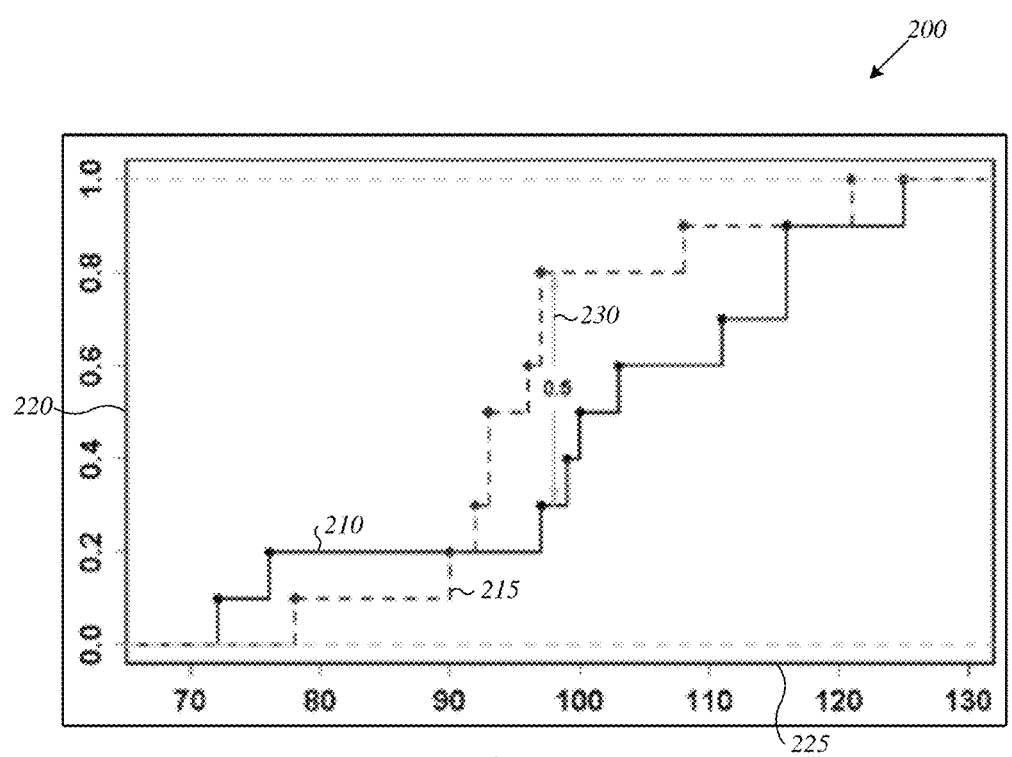
FIG. 2 is a figure that illustrates empirical cumulative distribution functions (ECDFs) and the Kolmogorov distance between them.

FIG. 2 is a diagram that illustrates at 200 both ECDF functions with n samples indicated at a solid line 210 and n+k samples indicated at a broken line 215. The y-axis is illustrated at 220 and is normalized to 1 and is representative of a probability (or frequency) that the value of a sample point is no bigger than x. The x-axis is illustrated at 225 and is representative of the values of the samples. A maximum distance between the ECDFs is 0.5 as indicated at 230, the maximum difference of the values over all sample values on the x-axis. The maximum distance is the absolute value of the y-axis difference between the two functions over the course of the values of the samples.

In a first example, samples $x_1, \ldots, x_n, \ldots$ may be drawn from the standard normal continuous probability distribution N(0, 1) (or Gamma(2, 2)—a two parameter family of continuous probability distributions) of samples. The Kolmogorov distance, $D_{n,n+k}$, between the ECDFs of $x_1, \ldots, x_n$ and $x_1, \ldots, x_n, \ldots, x_{n+k}$ is measured. In different embodiments, a successive set of samples may be generated by simply adding k randomly selected samples to a preceding set of samples, or in some embodiments, the successive set may be generated by generating a completely new set of n+k random samples.

$D_{n,n+k}$ is examined in two ways: (1) k is fixed to be 50, 100, 150, and n varies as illustrated in graph form FIG. 3 at 300 and FIG. 4 at 400. (2) n is fixed, and k varies as illustrated in FIG. 5 at 500 and FIG. 6 at 600. It may be observed that the larger lag k is more likely to achieve larger $D_{n,n+k}$ for any fixed n, and a larger sample size n is more likely to achieve a stable ECDF.

Figure 3:
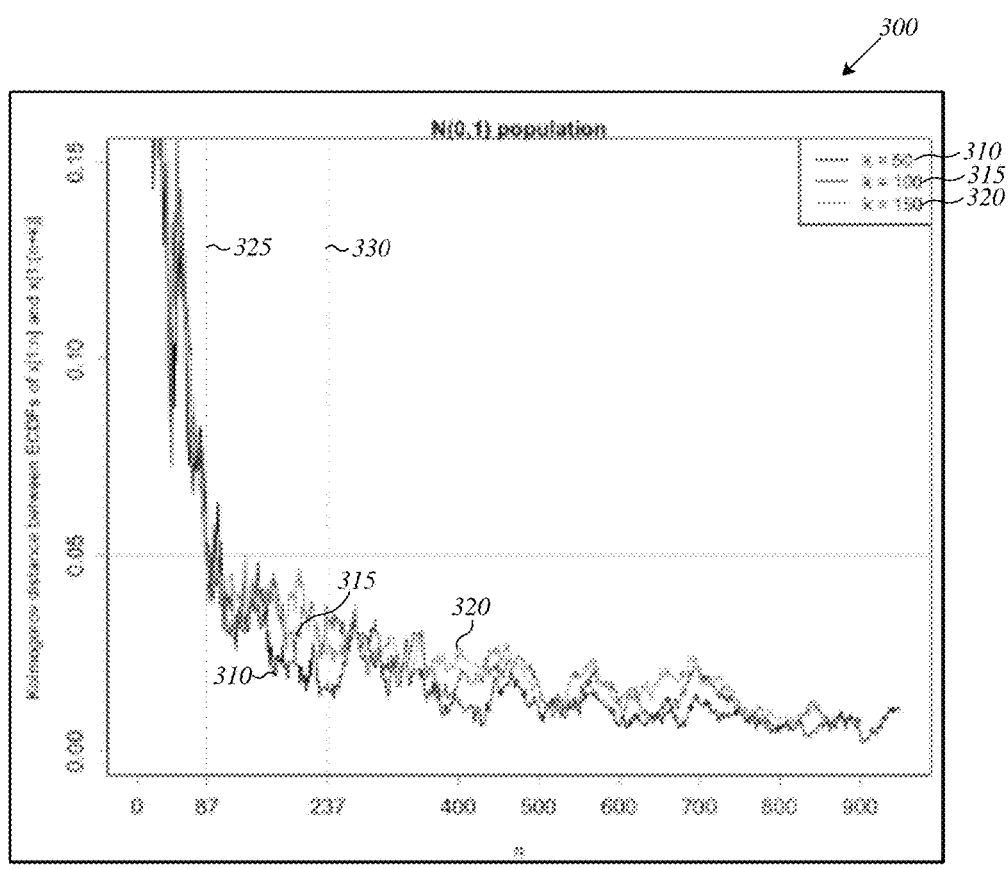
FIG. 3 is a graph illustrating an N(0,1) sample population with a distance between ECDFs of x[1:n] and x[1:n+k] with lag, k, fixed at 50, 100, and 150 according to an example embodiment.

In FIG. 3, corresponding to an N(0,1) sample population, the y-axis is the Kolmogorov distance between ECDFs of x[1:n] and x[1:n+k], with the x-axis corresponding to n. The lag, k, is fixed. Three plots 310, 315, and 320 are shown corresponding to k's of 50, 100, and 150 respectively. Two vertical broken lines 325 and 330 correspond to respective risky and safe values of the number of samples n.

Figure 4:
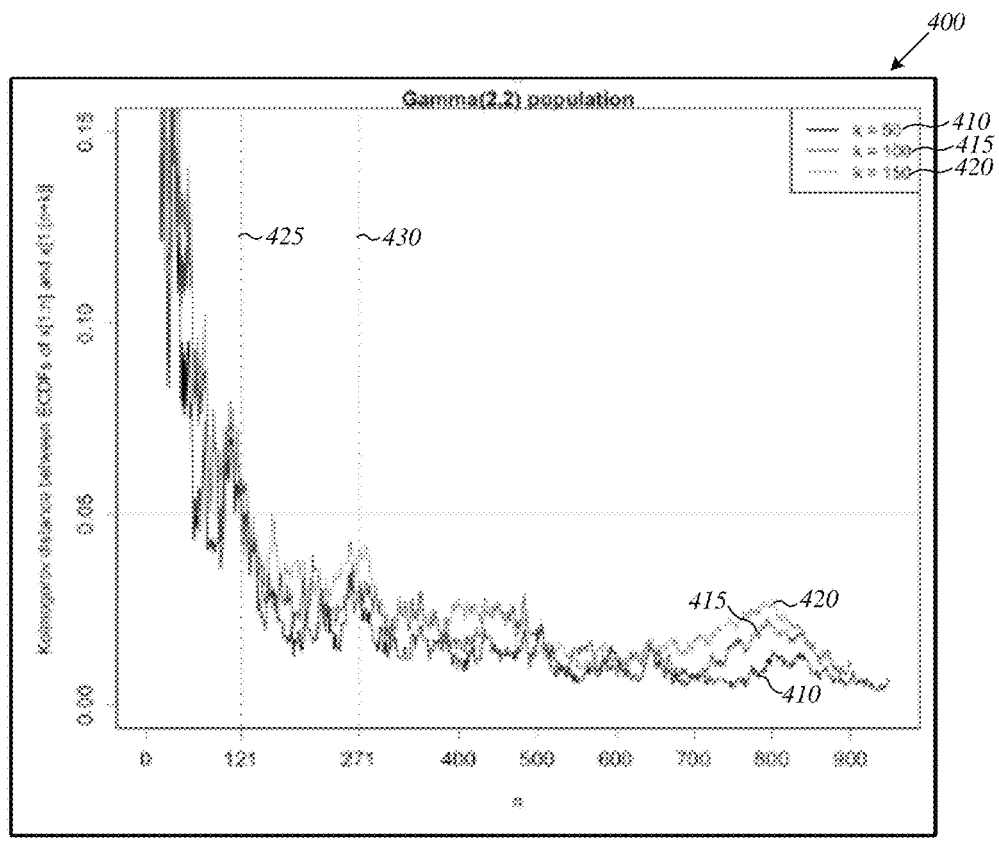
FIG. 4 is a graph illustrating an Gamma(2,2) sample population with a distance between ECDFs of x[1:n] and x[1:n+k] with lag, k, fixed at 50, 100, and 150 according to an example embodiment.
Figure 5:
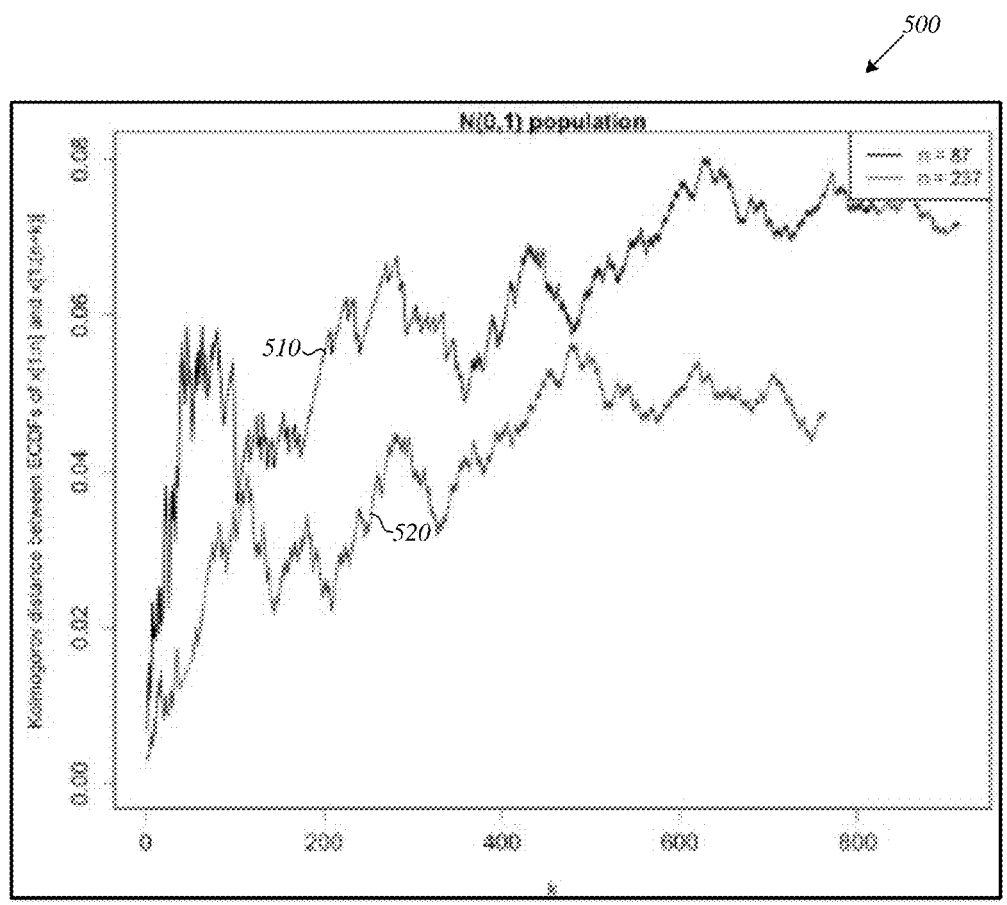
FIG. 5 is a graph illustrating an N(0,1) sample population with a distance between ECDFs of x[1:n] and x[1:n+k] with n fixed according to an example embodiment.

In FIG. 4 at 400, corresponding to a Gamma(2,2) sample population, the y-axis is the Kolmogorov distance between ECDFs of x[1:n] and x[1:n+k], with the x-axis corresponding to n. The lag, k, is fixed. Three plots 410, 415, and 420 are shown corresponding to k's of 50, 100, and 150 respectively. Two vertical broken lines 425 and 430 correspond to respective risky and safe values of the number of samples n.

Given a threshold, say t=0.05, the first value of n satisfying $D_{n,n+k} \leq t$ may be found and referred to as a risky sample size. The value of n+k is referred to as a safe sample size. The risky and safe sample sizes are shown by the vertical broken lines.

Figure 6:
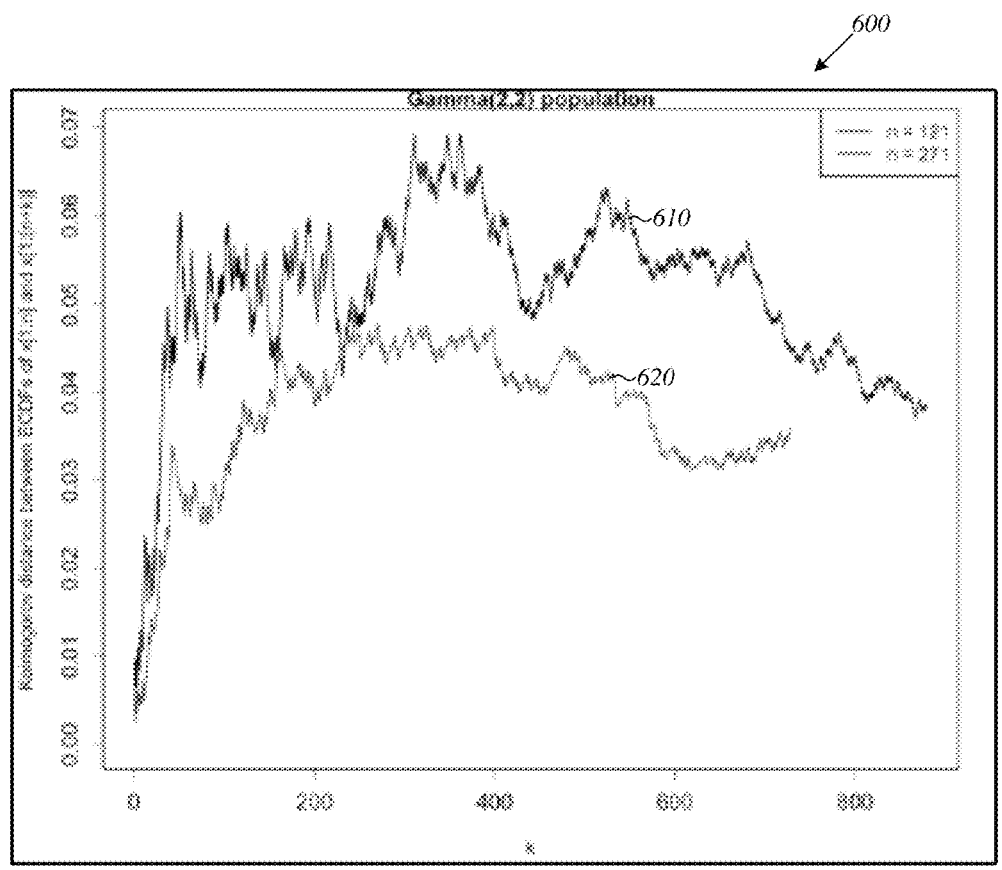
FIG. 6 is a graph illustrating an Gamma(2,2) sample population with a distance between ECDFs of x[1:n] and x[1:n+k] with n fixed according to an example embodiment.

For both risky and safe sample sizes $\hat{n}$, the Kolmogorov distances $D_{\hat{n},\hat{n}+k}$ are also shown as k varies in FIGS. 5 and 6.

In FIG. 5 at 500, corresponding to an N(0,1) sample population, the y-axis is the Kolmogorov distance between ECDFs of x[1:n] and x[1:n+k], with the x-axis corresponding to k. The sample size n is fixed. Two plots 510 and 520 are shown corresponding to n's of 87 and 237 respectively.

In FIG. 6 at 600, corresponding to a Gamma(2,2) sample population, the y-axis is the Kolmogorov distance between ECDFs of x[1:n] and x[1:n+k], with the x-axis corresponding to k. The sample size n is fixed. Two plots 610 and 620 are shown corresponding to n's of 121 and 271 respectively.

Figure 7:
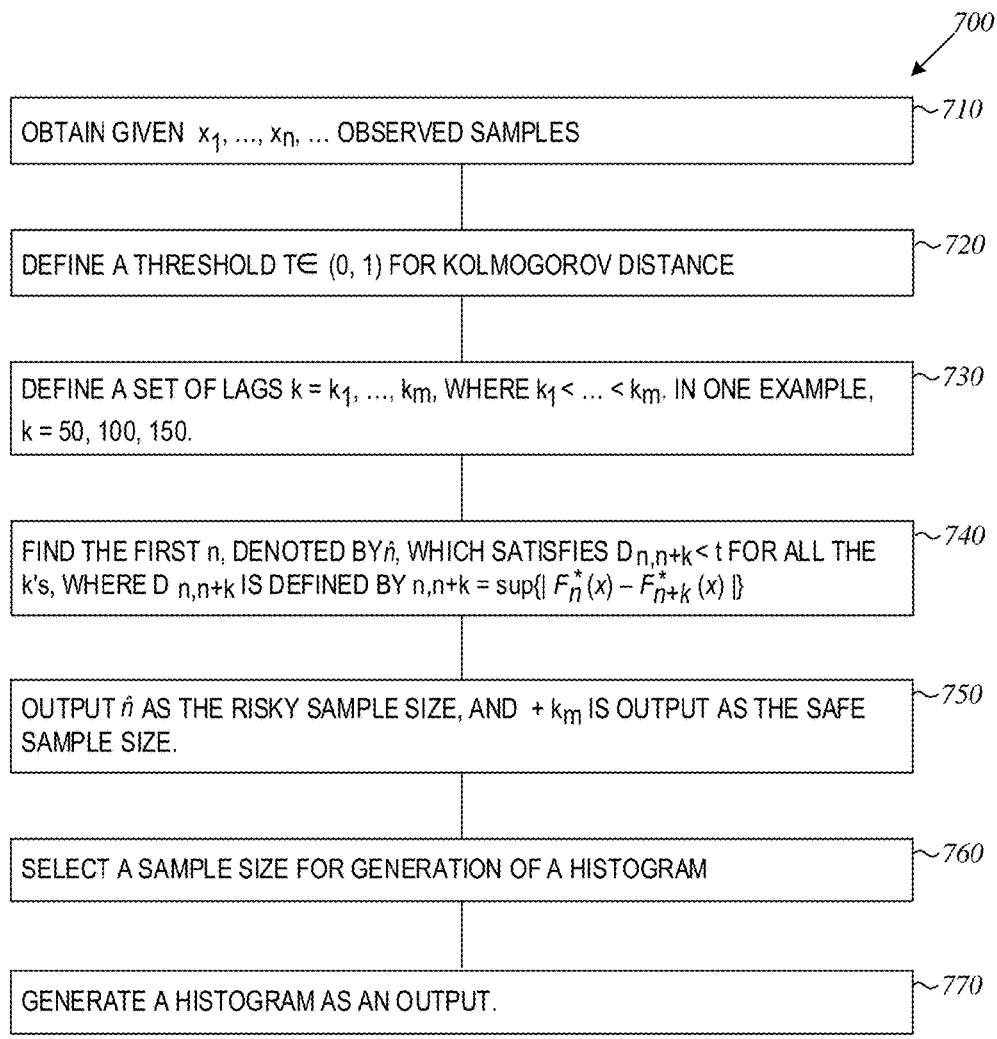
FIG. 7 is a flowchart illustrating a computer implemented method of finding suitable sample size n, which size is sufficient for describing the original sample population accurately according to an example embodiment.

FIG. 7 is a flowchart illustrating a computer implemented method 700 or algorithm of finding suitable sample size n, which size is sufficient for describing the original sample population accurately. No assumption about the population distribution is needed. At 710, given $x_1, \ldots, x_n, \ldots$ observed samples, a threshold $t \in (0, 1)$ is defined at 720 for Kolmogorov distance, and a set of lags $k = k_1, \ldots, k_m$, where $k_1 < \ldots < k_m$ is also defined at 730. In one example, k=50, 100, 150.

At 740, the first n, denoted by $\hat{n}$, is found which satisfies $D_{n,n+k} \leq t$ for all the k's, where $D_{n,n+k}$ is defined by Eq 1: $D_{n,n+k} = \sup\{|F^*(x) - F_{n+k}^*(x)|\}$. At 750, $\hat{n}$ is output as the risky sample size, and $\hat{n}+k_m$ is output as the safe sample size. The risky and safe sample sizes are the first two successive sets whose difference reaches the threshold. At 760, a sample size is selected for generation of an empirical distribution representation such as a histogram, and at 770, the histogram may be generated and provided as an output. The sample size may be a value between the risky and safe sample sizes, inclusive. In some embodiments, the sample size used for the generation of the histogram may be varied outside the range of risky and safe sample sizes depending on the needs of a user and resources available.

In one example embodiment, there may be multiple lags denoted as k values, for example, k=k1, k2, and k3. For each k, a distance between n samples and n+k samples, referred to as D is calculated. This results in distances D1, D2, and D3 corresponding to the different values of k. From these distances, a maximal distance, K_max is calculated as max(D1, D2, D3). The iteration continues until K_max is below the threshold and the stable empirical distribution is constructed using a number of samples where the number is inclusively between n and n+max(k1, k2, k3).

Figure 8:
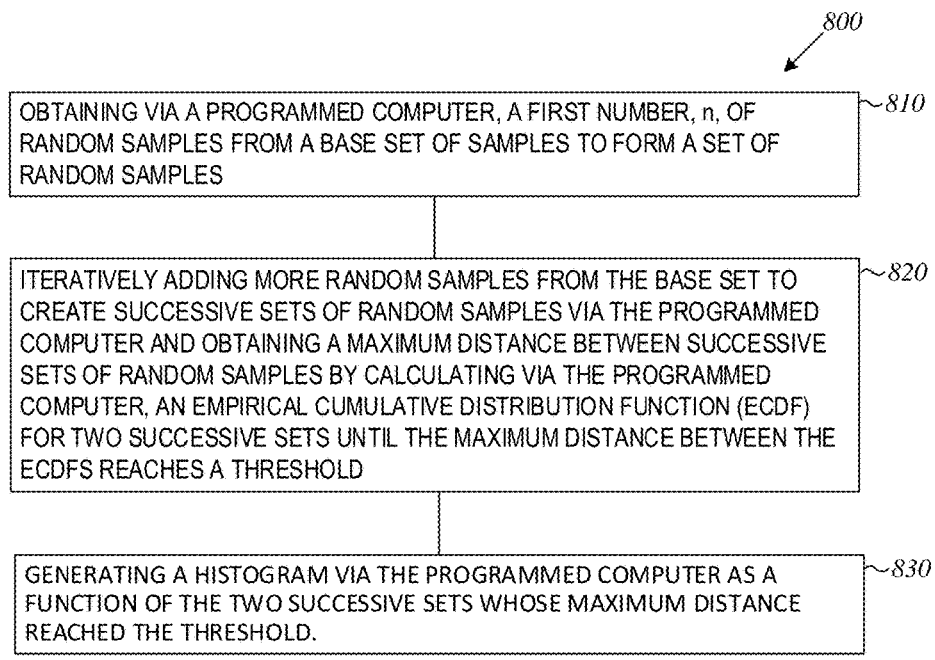
FIG. 8 is a flowchart illustrating a generalized method of estimating a number of samples for generation of a stable histogram according to an example embodiment.

FIG. 8 is a flowchart illustrating a generalized method 800 of estimating a number of samples for generation of a stable histogram. At 810, a programmed computer obtains a first number, n, of random samples from a base set of samples to form a set of random samples. At 820, the computer iteratively adds more random samples from the base set to create successive sets of random samples and obtains a distance between successive sets of random samples by calculating an empirical cumulative distribution function (ECDF) for two successive sets until the distance between the ECDFs reaches a threshold.

At 830 the programmed computer generates a histogram as a function of the two successive sets whose distance reached the threshold.

Figure 9:
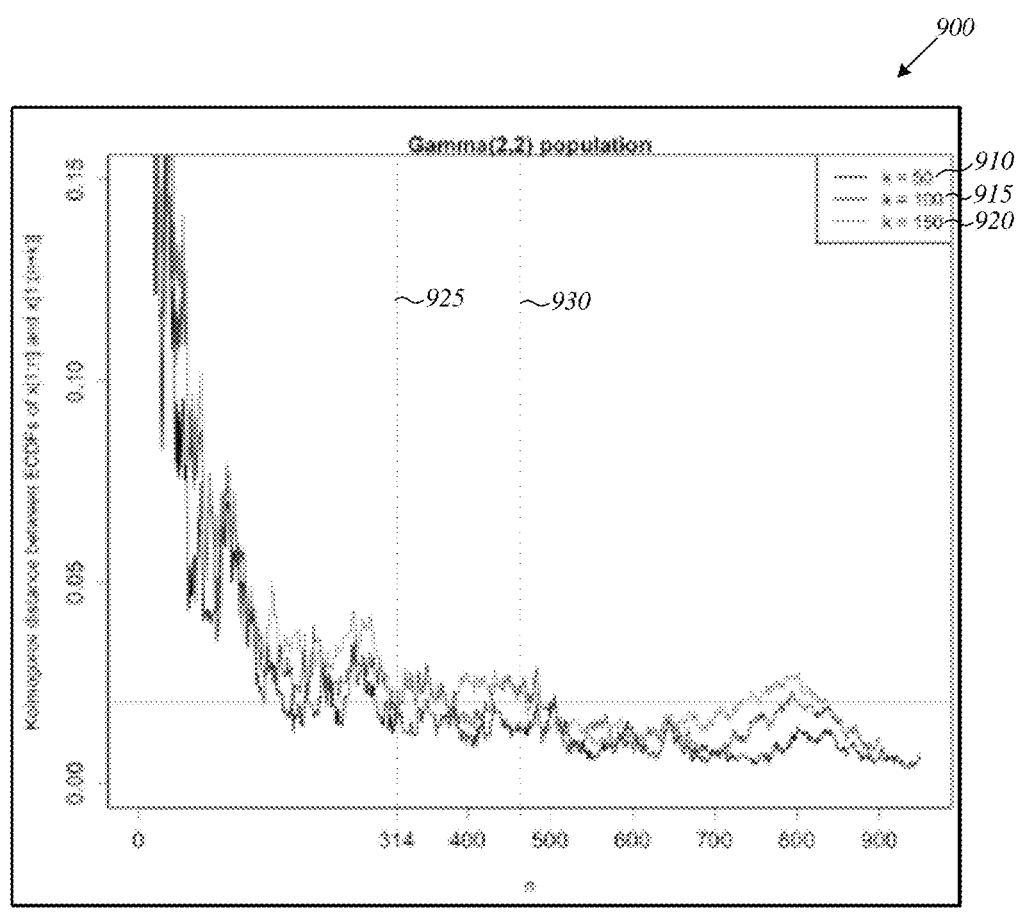
FIG. 9 is a graph illustrating an Gamma(2,2) sample population with a distance between ECDFs of x[1:n] and x[1:n+k] with lag, k, fixed at 50, 100, and 150, and a threshold, t, of 0.02 according to an example embodiment.

In general, a small threshold t means small tolerance of difference between ECDFs, and will lead to larger risky and safe sample sizes. In FIG. 9 at 800, corresponding to a Gamma(2,2) sample population with t=0.02 as compared to the prior example with a t of 0.05, larger risky and safe sample sizes are obtained. Again, the y-axis is the Kolmogorov distance between ECDFs of x[1:n] and x[1:n+k], with the x-axis corresponding to n. The lag, k, is fixed. Three plots 910, 915, and 920 are shown corresponding to k's of 50, 100, and 150 respectively. Two vertical broken lines 925 and 930 correspond to respective risky and safe values, 314 and 464 of the number of samples n.

Figure 10:
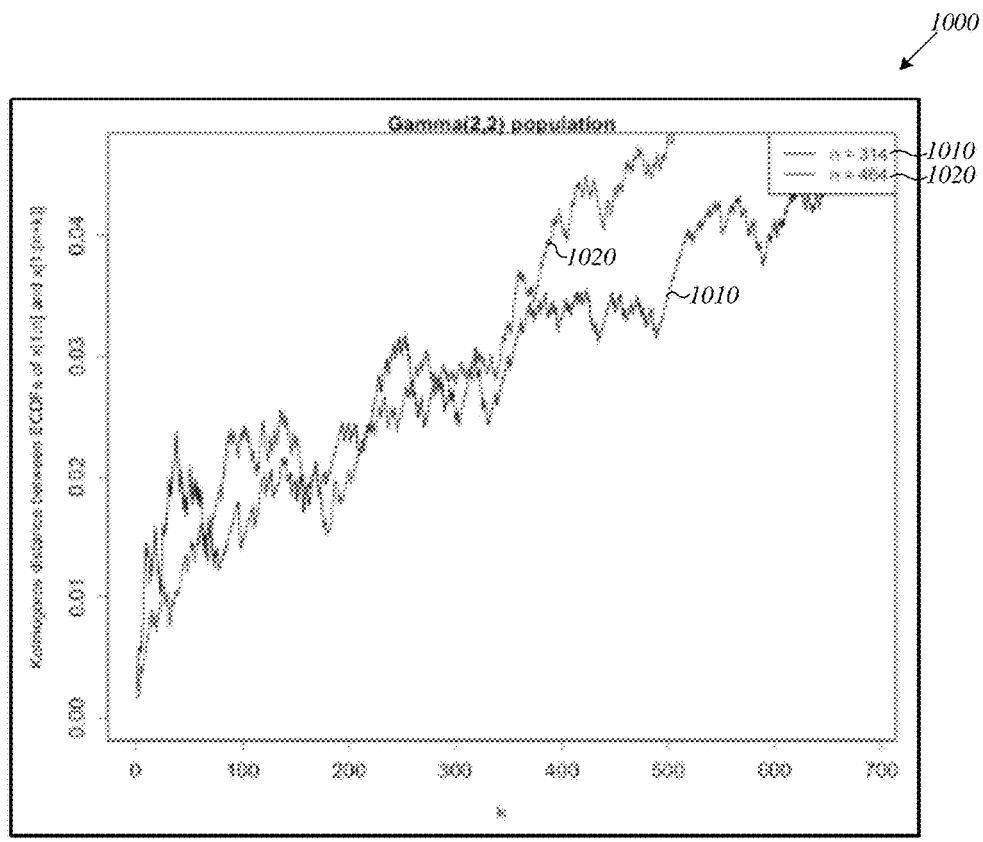
FIG. 10 is a graph illustrating an Gamma(2,2) sample population with a distance between ECDFs of x[1:n] and x[1:n+k] with n fixed, and a threshold, t, of 0.02 according to an example embodiment.

In FIG. 10 at 1000, corresponding to a Gamma(2,2) sample population, the y-axis is the Kolmogorov distance between ECDFs of x[1:n] and x[1:n+k], with the x-axis corresponding to k. The sample size n is fixed. Two plots 1010 and 1020 are shown corresponding to n's of 314 and 464 respectively.

The sample size estimation algorithm may be naturally applied to the online searching of suitable sample size, even when the population size in unknown. As the algorithm stops, the sample size of $s=\hat{n}+k_m$ is enough to describe the population by the observations $x_1, \ldots, x_s$, in the tolerance of Kolmogorov distance threshold t. Thus, users may select the threshold t as a function of the computing resources available versus the desired stability or accuracy of the resulting histogram to be generated.

As a sketch of the population, the risky sample size $\hat{n}$ makes $x_1, \ldots, x_{\hat{n}}$ applicable in some situations that a minimum suitable sample size is desired, consuming fewer computing resources to generate.

Figure 11:
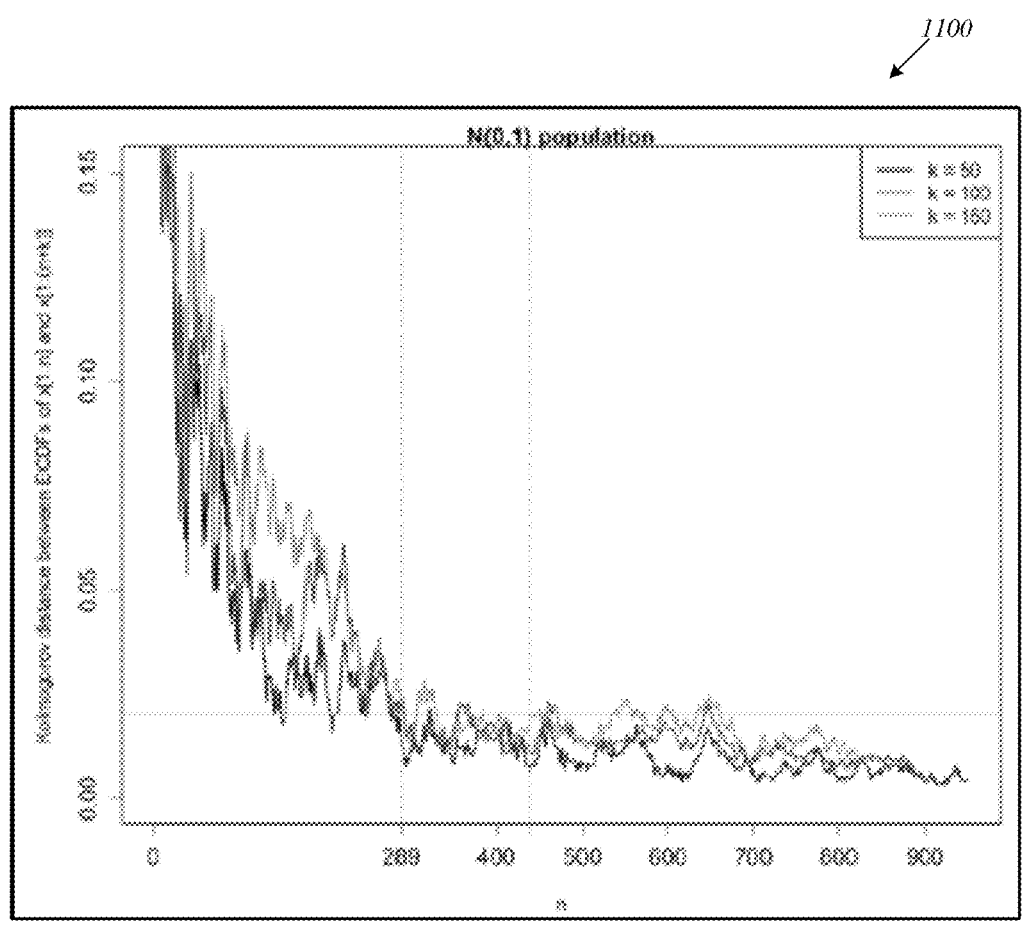
FIG. 11 is a graph illustrating an N(0,1) sample population of 1000 with a distance between ECDFs of x[1:n] and x[1:n+k] with lag, k, fixed at 50, 100, and 150, and a threshold, t, of 0.02 according to an example embodiment.
Figure 12:
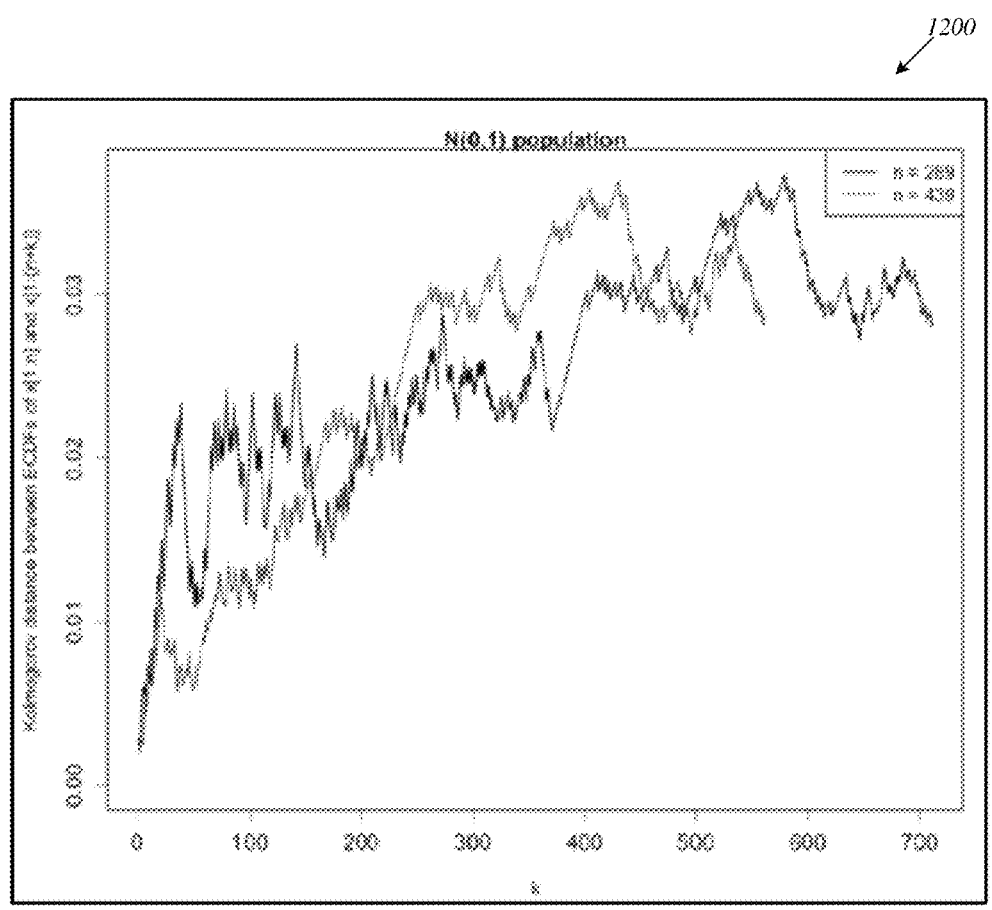
FIG. 12 is a graph illustrating an N(0,1) sample population of 1000 with a distance between ECDFs of x[1:n] and x[1:n+k] with n fixed, and a threshold, t, of 0.02 according to an example embodiment.
Figure 13:
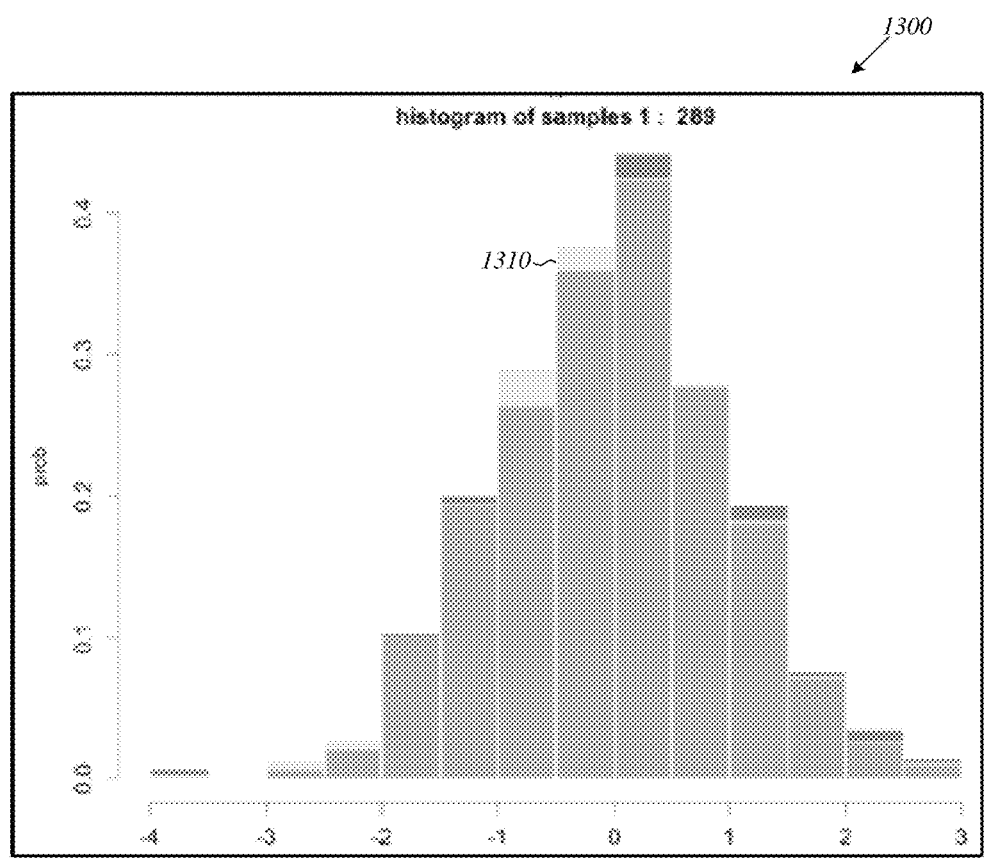
FIG. 13 is a histogram for a risky sample size with a threshold, t, of 0.02, from the 1000 samples according to an example embodiment.
Figure 14:
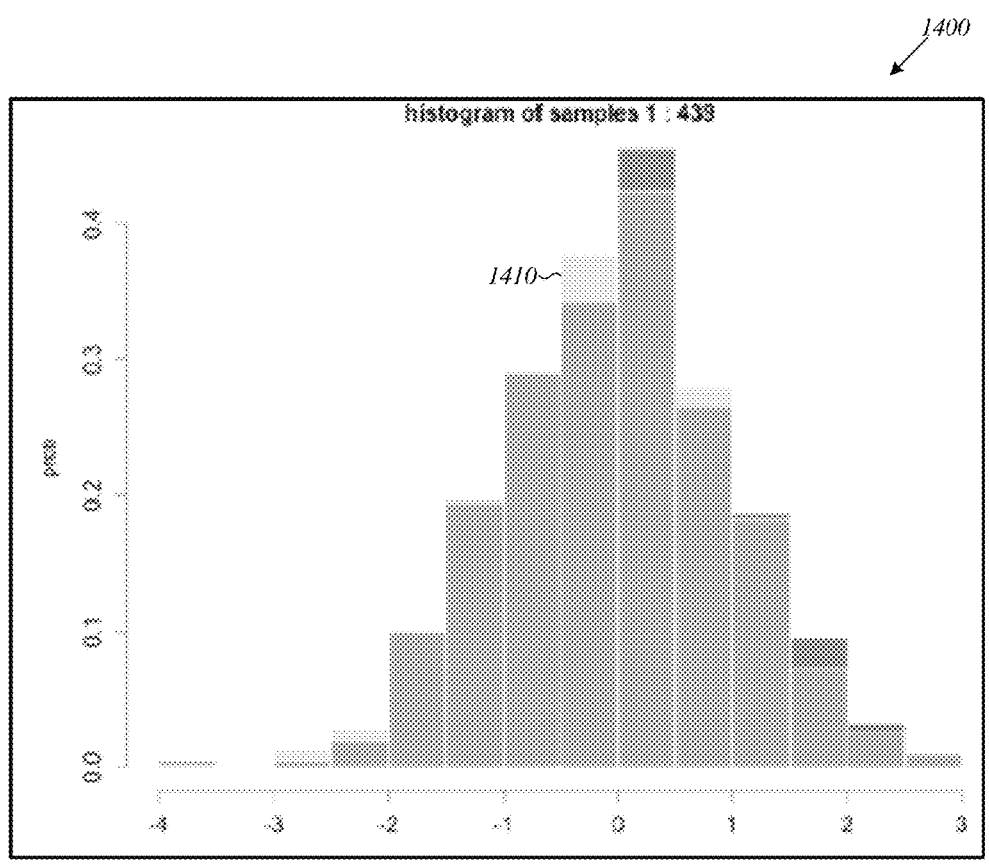
FIG. 14 is a histogram for a safe sample size with a threshold, t, of 0.02, from the 1000 samples according to an example embodiment.

In a second example, 1000 samples may be drawn from N(0, 1). Let t=0.02 and k=50, 100, 150. By Algorithm 2.1, the risky and safe sample sizes are estimated to be 289 and 439 in this experiment. FIG. 11 at 1100 illustrates the Kolmogorov distance for various fixed values of k, and FIG. 12 at 1200 illustrates the Kolmogorov distance for various fixed values of n. FIG. 13 at 1300 illustrates a histogram for the risky sample of 289 samples, while FIG. 14 at 1400 illustrates a histogram for the safe sample of 439 values. The histogram of all 1000 samples is also shown in areas having cross hatching consistent with 1310 and 1410 in the respective figures.

Figure 15:
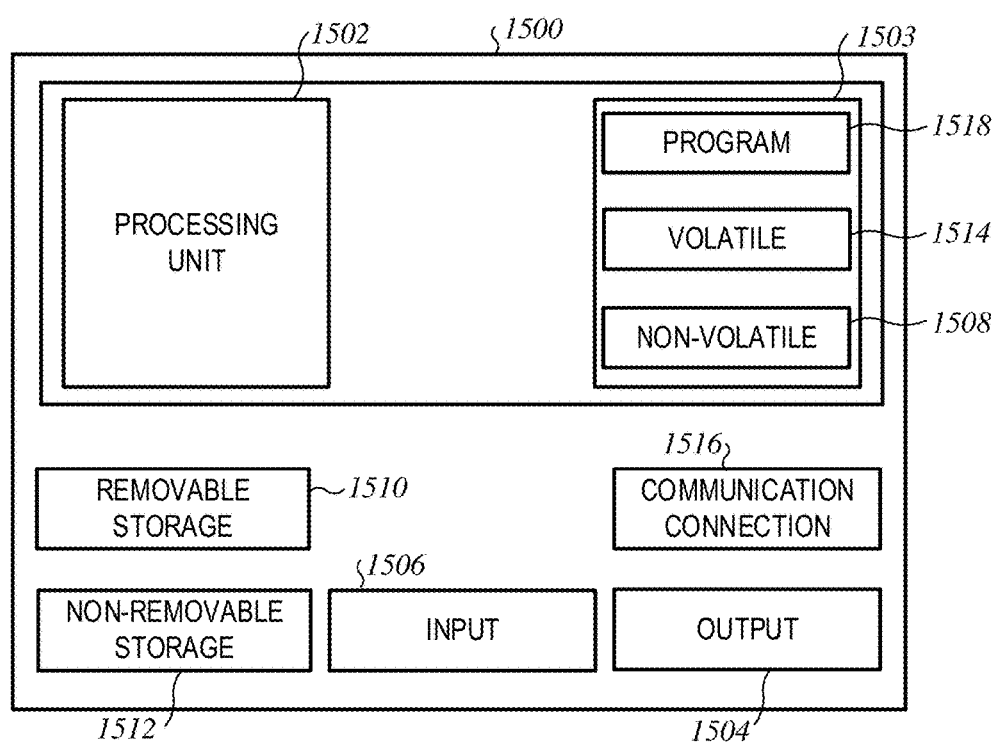
FIG. 15 is a block diagram illustrating circuitry for implementing various methods and algorithms according to example embodiments.

FIG. 15 is a block diagram illustrating circuitry for clients, servers, cloud based resources for implementing algorithms and performing methods according to example embodiments. All components need not be used in various embodiments. For example, the clients, servers, and network resources may each use a different set of components, or in the case of servers for example, larger storage devices.

One example computing device in the form of a computer 1500 may include a processing unit 1502, memory 1503, removable storage 1510, and non-removable storage 1512. Although the example computing device is illustrated and described as computer 1500, the computing device may be in different forms in different embodiments. For example, the computing device may instead be a smartphone, a tablet, smartwatch, or other computing device including the same or similar elements as illustrated and described with regard to FIG. 15. Devices, such as smartphones, tablets, and smartwatches, are generally collectively referred to as mobile devices or user equipment. Further, although the various data storage elements are illustrated as part of the computer 1500, the storage may also or alternatively include cloud-based storage accessible via a network, such as the Internet or server based storage.

Memory 1503 may include volatile memory 1514 and non-volatile memory 1508. Computer 1500 may include—or have access to a computing environment that includes—a variety of computer-readable media, such as volatile memory 1514 and non-volatile memory 1508, removable storage 1510 and non-removable storage 1512. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1500 may include or have access to a computing environment that includes input 1506, output 1504, and a communication connection 1516. Output 1504 may include a display device, such as a touchscreen, that also may serve as an input device. The input 1506 may include one or more of a touchscreen, touchpad, mouse, keyboard, camera, one or more device-specific buttons, one or more sensors integrated within or coupled via wired or wireless data connections to the computer 1500, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 1502 of the computer 1500. A hard drive, CD-ROM, and RAM are some examples of articles including a non-transitory computer-readable medium such as a storage device. The terms computer-readable medium and storage device do not include carrier waves to the extent carrier waves are deemed too transitory. For example, a computer program 1518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1500 to provide generic access controls in a COM based computer network system having multiple users and servers. Storage can also include networked storage such as a storage area network (SAN) indicated at 1520.

Examples

1. In example 1, a method includes obtaining via a programmed computer, a first set of n random samples and a second set of n+k random samples from a base set of samples where k is a lag, iteratively adding more random samples to the first and second sets from the base set via the programmed computer, obtaining a distance between the first and second sets of random samples by calculating via the programmed computer, an empirical cumulative distribution function (ECDF) for the first and second sets, respectively, and a distance between the two ECDFS, in each iteration until the distance between the ECDFs is below a threshold, and constructing a stable empirical distribution representation via the programmed computer using a number of samples that is a function of the first and second sets whose distance is below the threshold.

2. The method of example 1 wherein adding more random samples comprises adding a fixed number, k, of samples to each successive set such that each successive set has k more samples than a preceding set.

3. The method of example 2 wherein n is greater than k, and wherein k is between 50 and 150.

4. The method of any of examples 2-3 wherein the two successive sets differ in size by k, and wherein the set with the lower number of samples is defined as a risky sample size and the set with k more samples is defined as a safe sample size.

5. The method of example 4 wherein a smaller threshold results in larger risky and safe sample sizes than larger thresholds.

6. The method of any of examples 1-5 wherein the stable empirical distribution representation comprises a number of samples that is inclusively between the number of samples of the two successive sets whose maximum distance reached the threshold.

7. The method of any of examples 1-6 wherein the base set of samples comprises a very large set of samples and wherein the two successive sets whose maximum distance reached the threshold comprises a small percentage of the base set of samples.

8. The method of example 7 wherein the stable empirical distribution representation comprises a number of samples where the number is inclusively between the number of samples of the first set and the number of samples of the largest second set when the maximum distance between the first set and the second sets is below the threshold.

9. The method of any of examples 1-8 wherein the base set of samples is generated continuously and the size of the base set is unknown.

10. The method of any of examples 1-9 wherein given the random samples X1, ..., Xn, the ECDF is defined by the following step function:

$$F^*(x)=1/n\#\{X_i \leq x : i=1,2,\ldots,n\}$$

where $\#\{Xi \leq x: I=1, 2, \ldots, n\}$ denotes the number of Xi's that are no bigger than x.

11. The method of example 10 wherein the maximum distance between successive sample ECDFs is defined as $$D_{n,n+k}=sup\{|F^*_n(x)-F^*_{n+k}(x)|\} \text{ where } k \text{ is any natural number.}$$

12. In example 12, a computer implemented system includes processing circuitry, a storage device coupled to the processing circuitry, and code stored on the storage device for execution by the processing circuitry to perform operations. The operations include obtaining via a programmed computer, a first set of n random samples and a second set of n+k random samples from a base set of samples where k is a lag, iteratively adding more random samples to the first and second sets from the base set via the programmed computer, obtaining a distance between the first and second sets of random samples by calculating via the programmed computer, an empirical cumulative distribution function (ECDF) for the first and second sets, respectively, for each iteration until the distance between the ECDFs is below a threshold, and constructing a stable empirical distribution representation via the programmed computer using a number of samples that is a function of the first and second sets whose distance is below the threshold.

13. The computer implemented system of example 12 wherein adding more random samples comprises adding a fixed number, k, of samples to each successive set such that each successive set has k more samples than a preceding set, wherein the two successive sets differ in size by k, and wherein the set with the lower number of samples is defined as a risky sample size and the set with k more samples is defined as a safe sample size.

14. The computer implemented system of any of examples 11-13 wherein given the random samples X1, ..., Xn, the ECDF is defined by the following step function:

$$F^*(x)=1/n\#\{X_i \leq x : i=1,2,\ldots,n\}$$

where $\#\{Xi \leq x: I=1, 2, \ldots, n\}$ denotes the number of Xi's that are no bigger than x.

15. The computer implemented system of example 14 wherein the maximum distance between successive sample ECDFs is defined as $$D_{n,n+k}=sup\{|F^*_n(x)-F^*_{n+k}(x)|\} \text{ where } k \text{ is any natural number.}$$

16. In example 16, a non-transitory computer readable storage device has instructions for execution by a processor to perform operations. The operations include obtaining via a programmed computer, a first set of n random samples and a second set of n+k random samples from a base set of samples where k is a lag, iteratively adding more random samples to the first and second sets from the base set to create successive sets of random samples via the programmed computer, obtaining a distance between the first and second sets of random samples by calculating via the programmed computer, an empirical cumulative distribution function (ECDF) for the first and second sets, respectively, for each iteration until the distance between the ECDFs is below a threshold, and constructing a stable empirical distribution representation via the programmed computer using a number of samples that is a function of the first and second sets whose distance is below the threshold.

17. The non-transitory computer readable storage device of example 16 wherein adding more random samples comprises adding a fixed number, k, of samples to each successive set such that each successive set has k more samples than a preceding set.

18. The non-transitory computer readable storage device of example 17 wherein the two successive sets differ in size by k, and wherein the set with the lower number of samples is defined as a risky sample size and the set with k more samples is defined as a safe sample size.

19. The non-transitory computer readable storage device of any of examples 16-18 wherein given the random samples X1, ..., Xn, the ECDF is defined by the following step function:

$$F^*(x)=1/n\#\{X_i \leq x : i=1,2,\ldots,n\}$$

where $\#\{Xi \leq x: I=1, 2, \ldots, n\}$ denotes the number of Xi's that are no bigger than x.

20. The non-transitory computer readable storage device of example 19 wherein the maximum distance between successive sample ECDFs is defined as $$D_{n,n+k}=sup\{|F^*_n(x)-F^*_{n+k}(x)|\} \text{ where } k \text{ is any natural number.}$$

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
obtaining via a programmed computer, a first set of n random samples and a second set of n+k random samples from a base set of samples where k is a lag;
iteratively adding more random samples to the first and second sets from the base set via the programmed computer;
obtaining a distance between the first and second sets of random samples by calculating via the programmed computer, an empirical cumulative distribution function (ECDF) for the first and second sets, respectively, and the distance between the two ECDFs, in each iteration until the distance between the ECDFs is below a threshold; and constructing a stable empirical distribution representation via the programmed computer using a number of samples that is a function of the first and second sets whose distance is below the threshold.

2. The method of claim 1 wherein adding more random samples comprises adding a fixed number, k, of samples to n during each iteration.

3. The method of claim 2 wherein n is greater than k, and wherein k is between 50 and 150.

4. The method of claim 2 wherein the first set with the lower number of samples is defined as a risky sample size and the second set with k more samples is defined as a safe sample size for the first and second sets whose distance is below the threshold.

5. The method of claim 4 wherein a smaller threshold results in larger risky and safe sample sizes than larger thresholds.

6. The method of claim 1 wherein the stable empirical distribution representation comprises a number of samples that is inclusively between the number of samples of the first and second sets whose distance is below the threshold.

7. The method of claim 1 and further comprising obtaining a set of distances between the first set of n samples and multiple second sets of n+k samples for different values of k, and wherein obtaining a distance is based on a maximum distance of the set of distances.

8. The method of claim 7 wherein the stable empirical distribution representation comprises a number of samples where the number is inclusively between the number of samples of the first set and the number of samples of the largest second set when the maximum distance between the first set and the second sets is below the threshold.

9. The method of claim 1 wherein the base set of samples is generated continuously and the size of the base set is unknown.

10. The method of claim 1 wherein given the random samples X1, . . . ,Xn, the ECDF is defined by the following step function:

$$F^*(x)=1/n\#\{X_i \leq x: i=1,2\ldots,n\}$$

where $\#\{X_i \leq x: I=1, 2, \ldots n\}$ denotes the number of Xi's that are no bigger than x, the number of samples in the base set.

11. The method of claim 10 wherein the distance between the first and second set ECDFs is defined as $$D_{n,n+k}=\sup\{|F^*_n(x)-F^*_{n+k}(x)|\} \text{ where } k \text{ is any natural number.}$$

12. A computer implemented system comprising:
processing circuitry;
a storage device coupled to the processing circuitry; and
code stored on the storage device for execution by the processing circuitry to perform operations comprising:
    obtaining via a programmed computer, a first set of n random samples and a second set of n+k random samples from a base set of samples where k is a lag;
    iteratively adding more random samples to the first and second sets from the base set via the programmed computer;
    obtaining a distance between the first and second sets of random samples by calculating via the programmed computer, an empirical cumulative distribution function (ECDF) for the first and second sets, respectively, and a distance between the two ECDFs, for each iteration until the distance between the ECDFs is below a threshold; and
    constructing a stable empirical distribution representation via the programmed computer using a number of samples that is a function of the first and second sets whose distance is below the threshold.

13. The computer implemented system of claim 12 wherein adding more random samples comprises adding a fixed number, k, of samples to n during each iteration and wherein the first set with the lower number of samples is defined as a risky sample size and the second set with k more samples is defined as a safe sample size for the first and second sets whose distance is below the threshold.

14. The computer implemented system of claim 12 wherein given the random samples X1, . . . , Xn, the ECDF is defined by the following step function:

$$F^*(x)=1/n\#\{X_i \leq x: i=1,2 \ldots,n\}$$

where $\#\{Xi \leq x: I=1, 2, \ldots,n\}$ denotes the number of Xi's that are no bigger than x, the number of samples in the base set.

15. The computer implemented system of claim 14 wherein the distance between first and second set ECDFs is defined as $$D_{n,n+k}=\sup\{|F^*_n(x)-F^*_{n+k}(x)|\} \text{ where } k \text{ is any natural number.}$$

16. A non-transitory computer readable storage device having instructions for execution by a processor to perform operations comprising:
    obtaining via a programmed computer, a first set of n random samples and a second set of n+k random samples from a base set of samples where k is a lag;
    iteratively adding more random samples to the first and second sets from the base set to create successive sets of random samples via the programmed computer;
    obtaining a distance between the first and second sets of random samples by calculating via the programmed computer, an empirical cumulative distribution function (ECDF) for the first and second sets, respectively, and a distance between the two ECDFs, for each iteration until the distance between the ECDFs is below a threshold; and
    constructing a stable empirical distribution representation via the programmed computer using a number of samples that is a function of the first and second sets whose distance is below the threshold.

17. The non-transitory computer readable storage device of claim 16 wherein adding more random samples comprises adding a fixed number, k, of samples to n during each iteration.

18. The non-transitory computer readable storage device of claim 17 wherein the first set with the lower number of samples is defined as a risky sample size and the second set with k more samples is defined as a safe sample size for the first and second sets whose distance is below the threshold.

19. The non-transitory computer readable storage device of claim 16 wherein given the random samples X1, . . . ,Xn, the ECDF is defined by the following step function:

$$F^*(x)=1/n\#\{X_i \leq x: i=1,2, \ldots,n\}$$

where $\#\{Xi \leq x: I=1, 2, \ldots, n\}$ denotes the number of Xi's that are no bigger than x, the number of samples in the base set.

20. The non-transitory computer readable storage device of claim 19 wherein the distance between first and second set ECDFs is defined as $$D_{n,n+k}=\sup\{|F^*_n(x)-F^*_{n+k}(x)|\} \text{ where } k \text{ is any natural number.}$$

* * * * *